Jan. 7, 1958  R. B. PETTIBONE ET AL  2,818,813
POWER TRANSMISSION
Filed Sept. 9, 1954  2 Sheets-Sheet 1
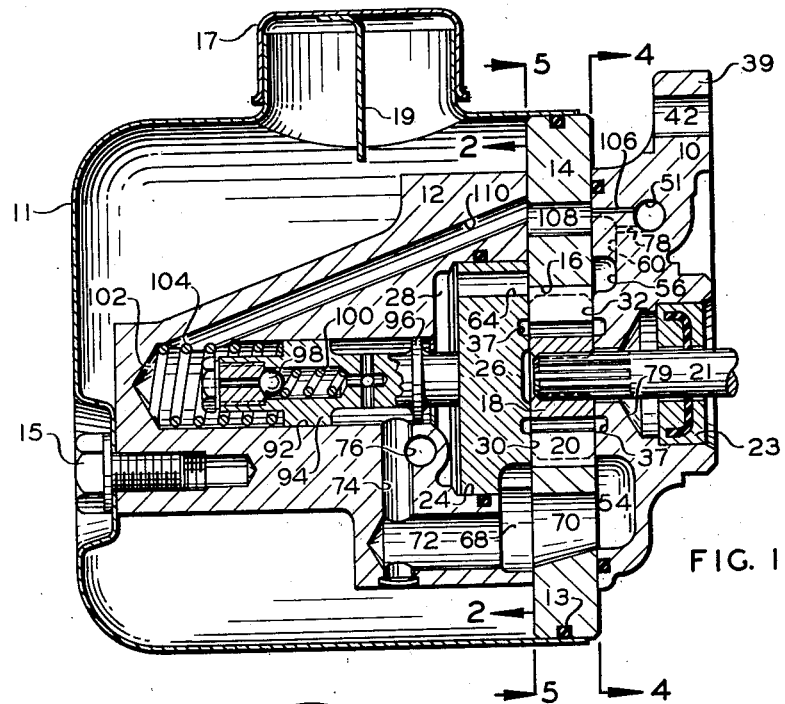
FIG. 1
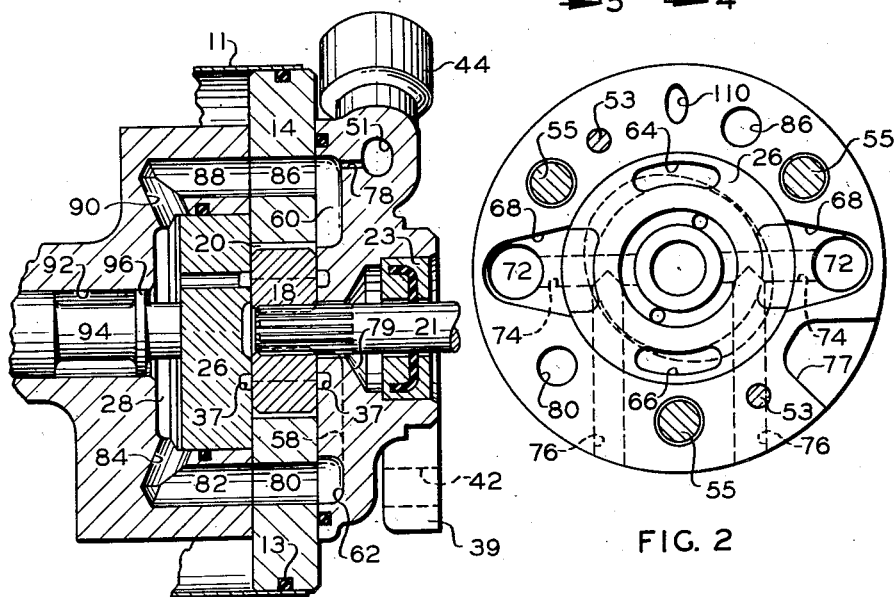
FIG. 3
FIG. 2
*INVENTORS*
RAYMOND B. PETTIBONE
RUSSELL H. HALLMAN
BY
*Ralph L. Truesdale*
ATTORNEY Jan. 7, 1958 R. B. PETTIBONE ET AL 2,818,813
POWER TRANSMISSION
Filed Sept. 9, 1954 2 Sheets-Sheet 2

INVENTORS
RAYMOND B. PETTIBONE
RUSSELL H. HALLMAN
BY
Ralph L. Truesdell
ATTORNEY

United States Patent Office 2,818,813
Patented Jan. 7, 1958

2,818,813

POWER TRANSMISSION

Raymond B. Pettibone, Detroit, and Russell H. Hallman, Royal Oak, Mich., assignors to Vickers Incorporated, Detroit, Mich., a corporation of Michigan Application September 9, 1954, Serial No. 454,863

4 Claims. (Cl. 103—42)

This invention relates to power transmissions, and is particularly applicable to those of the type comprising two or more fluid pressure energy translating devices, one of which may function as a pump and another as a fluid motor.

More particularly the invention relates to an improved pump structure for use in such a power transmission, capable of efficient operation over a wide range of speeds.

In many applications where fixed displacement pumping mechanism is directly driven by a variable speed prime mover, such as a motor vehicle engine, the hydraulic system is such that a relatively constant supply of fluid is required. Since the pump output varies directly with its speed, a large oversupply of fluid results at higher car speeds. This problem has been met by the use of flow control valves which divert the excess fluid pumped back to the reservoir or to the pump inlet. In many such prior devices the efficiency of operation has been impaired by the tortuous courses followed by the pumped fluid in passing from the pump discharge zones to the outlet connection and to the by-pass circuit.

It is an object of this invention to provide improved pumping structure in which the discharge ports and passages are arranged for low cost construction and efficient, high speed operation.

It is also an object to provide such pumping structure in which the flow control valve and the discharge ports and passages are so disposed relative to each other and the pump discharge zones as to minimize the flow path length for both the diverted and the utilized fluid.

Further objects and advantages of the present invention will be apparent from the following description, reference being had to the accompanying drawings wherein a preferred form of the present invention is clearly shown.

In the drawings:

Figure 1 is a longitudinal cross section of a pumping unit embodying the present invention and taken on line 1—1 of Figure 4.

Figure 2 is a transverse partial section taken on line 2—2 of Figure 1.

Figure 3 is a partial section taken on line 3—3 of Figure 5.

Figure 4:
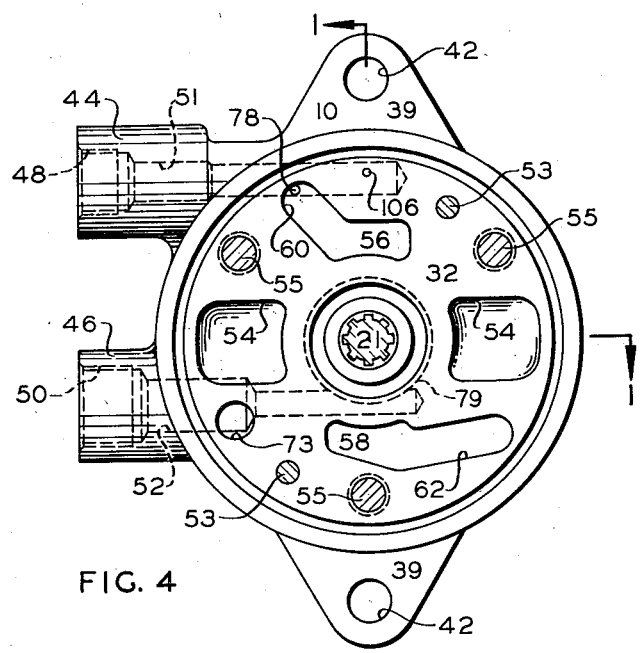
Figure 4 is a transverse section taken on line 4—4 of Figure 1.
Figure 5:
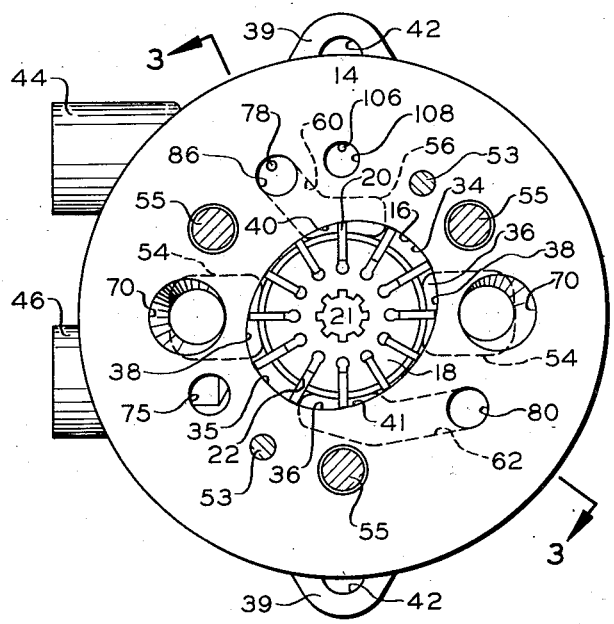
Figure 5 is a transverse section taken on line 5—5 of Figure 1.

Referring now to Figure 1 the pumping mechanism includes a pair of body members 10 and 12 having a stator member 14 sandwiched therebetween. An open-end reservoir 11 is telescoped over the body member 12 and engages in an O-ring seal 13 on the stator 14. The reservoir 11 is secured to the body member 12 by a screw 15 and includes a filler cap 17 having an oil level indicator 19 therein. The stator 14 has a generally elliptical pumping chamber 16 therein.

Telescopically positioned in the pumping chamber 16 is a rotor 18 having a plurality of vanes 20 radially slidable in slots 22. Rotor 18 is supported and driven by a shaft 21. A shaft seal 23 prevents leakage of fluid from body member 10 at the point of emergence therefrom of shaft 21. The body member 12 has a bore 24 therein which receives a pressure plate 26 to form a pressure chamber 28. The flat, plane face 30 of pressure plate 26 axially engages the adjacent faces of the rotor 18, vanes 20, and stator 14 to urge their axially opposed faces into fluid sealing engagement with the flat, plane face 32 of the body member 10. The pair of generally crescent shaped working spaces 34 and 35 thus formed between the ring 16 and the rotor 18 are divided into a plurality of pumping or working, chambers 36, between each pair of adjacent vanes. A pair of grooves 37 communicate with the inner ends of the vanes 20, conducting pressure from chamber 28 to maintain the vanes outward against stator 14.

As either one of the vanes bounding a particular working chamber moves along one of the ramps 38, that working chamber will increase in size. Similarly, those working chambers bounded by a vane traversing one of the ramps 40 or 41 will decrease in size. Those areas of the working spaces in which the working chambers are increasing in size are termed the inlet zones of the pump and conversely, those areas of the working spaces in which the working chambers are decreasing in size are termed outlet zones of the pump.

The body member 10 includes a pair of mounting ears 39 having mounting holes 42 therein. A pair of bosses 44 and 46 extend from the body member 10 and have therein external delivery and return connection ports 48 and 50, respectively. A delivery passage 51 extends from port 48 to the interior of body member 10. A return passage 52 extends from port 50 to the interior of body member 10. The body members 10 and 12 and stator 14 are kept in proper alignment by dowel pins 53 and secured together by bolts 55.

The structure thus far described is of a conventional type which is described more completely in the patent to Duncan B. Gardiner et al., No. 2,544,988. As fully described in that patent the pressure plate 26 which forms an axially shiftable element of body 12, deflects under the influence of pressure in chamber 28 to effectuate proper sealing between mating surfaces at varying pressures.

The improvement over the prior art resides primarily in the arrangement and disposition of the discharge ports and passages in the pumping structure and the relation of those ports and passages to the flow control valve, as hereinafter described.

A pair of inlet ports 54 and a pair of discharge ports 56 and 58 are milled to a limited depth into the face 32 of body member 10. The inlet ports 54 are regular in shape. The discharge port 56 includes an outwardly trenched arm 60 and the discharge port 58 includes an outwardly trenched arm 62. Inlet ports 54 overlie the inlet zones of the pumping mechanism and discharge ports 56 and 58 overlie the discharge zones. Pressure plate 26 has a pair of discharge ports 64 and 66 extending completely therethrough to communicate with the pressure chamber 28. Pressure ports 64 and 66 are axially opposed to pressure ports 56 and 58, respectively. Thus those pumping chambers which are bounded by vanes passing over the discharge ramp 40 will discharge fluid from opposite sides into the discharge ports 56 and 64 simultaneously. Similarly, those working chambers bounded by vanes passing over the discharge ramp 41 will simultaneously discharge into the discharge ports 58 and 66.

The inlet zones of the pump can receive fluid from both sides of the rotor through the inlet ports 54 and through a pair of inlet ports axially opposed thereto, formed in the pressure plate 26 and the body member 12 and designated 68. Each of the paired inlet ports 54, and 68 are interconnected by a passage 70 which extends through the stator. Each inlet port 68 communicates with the interior of reservoir 11 through intersecting drilled passages 72, 74, and 76.

Fluid returning from an operated motor passes from connection port 50 into the return passage 52. A drilled passage 73 in body member 10 intersects the return passage 52 and conducts the returning fluid to a mating passage 75 in the stator 14. Passage 75 discharges into a recess 77 in the face of body member 12 which communicates with the interior of reservoir 11. Fresh, cooled, and deaerated replacement fluid is conducted from the reservoir to the pump inlet zones through the intersecting passages 76, 74, and 72. Return passage 52 extends past the intersection with passage 73 so as to vent the shaft bore 79.

A small drilled passage 78 in the body member 10 extends from the outer end of the trenched arm 60 to communicate with the delivery passage 51. Fluid discharged into the port 56 thus follows a very short path from the working chambers to the delivery passage. The restriction to flow created by the drilled hole 78 is utilized to control operation of a flow regulating valve, as hereinafter described. The trenched arm 62, associated with the discharge port 58, extends outward and is coincident at its outer end with a drilled passage 80 which extends through the stator member 14. A drilled passage 82 in the body member 12 forms a continuation of the drilled passage 80 and is intersected by an angular drilled passage 84 which communicates with the pressure chamber 28. Another drilled passage 86 extends through the stator 14 to overlie trenched arm 60 and is connected by intersecting drilled passages 88 and 90 with the pressure chamber 28. As heretofore noted the discharge ports 64 and 66 extend completely through the pressure plate 26 to communicate with the pressure chamber 28. It will thus be seen that the entire volume of fluid discharged from the pumping chambers is manifolded by the delivery ports and passages to communicate with the pressure chamber 28. All fluid pumped, except that discharged into port 56, will pass through pressure chamber 28. Further, it will be seen that all fluid which passes to the delivery port 48 must pass through the restriction formed by drilled passage 78.

The body member 12 is provided with a central longitudinal bore 92 having a combination flow control and relief valve 94 slidable therein. Bore 92 intersects the transverse passage 74. Valve 94 includes a land 96, which, in the spring biased position illustrated, isolates the pressure chamber 28 from passage 74. As heretofore noted, passage 74 communicates with the reservoir 11 through the drilled passages 76 and with the inlet zones of the pumping mechanism through the passages 72. Valve 94 carries centrally therein a pilot relief valve 98 which is biased to the closed position by a spring 100.

The outer end of valve bore 92 forms, with the valve spool 94, a pressure chamber 102, the pressure in which chamber acts on the valve in opposition to the pressure exerted on the opposite end of the valve by pressure in pressure chamber 28. When the pressure in chamber 28 exceeds the pressure in chamber 102 by an amount established by the load of spring 104, the valve 94 will shift leftwardly and land 96 will open communication between the pressure chamber 28 and the transverse drilled passage 74. The pressure in chamber 28 which is exerted on the end of valve 94 is substantially that at the upstream side of restriction 78. The pressure in chamber 102 is substantially that at the downstream side of restriction 78, and is conducted to chamber 102 through the highly restricted passage 106 and the coincident passages 108 and 110 in the stator 14 and body member 12, respectively. The pressure drop across the restriction 78 controls operation of the flow controlling valve 94 and when flow through the restriction 78 exceeds a predetermined maximum the valve 94 will shift to divert fluid pumped in excess of that maximum. Increasing speed of rotor 18 results in diversion of an increasing amount of fluid from the pressure chamber 28 into the transverse passage 74.

The overload relief valve function of valve 94 is effected when the pressure in chamber 102 exceeds a predetermined maximum so as to open the pilot relief valve 98, thus venting the chamber 102 to the reservoir through the central opening in the valve 94. Due to the restriction of passage 106, pressure in chamber 102 will drop relative to the pressure in chamber 28 and valve 94 will shift irrespective of discharge rate of the pumping mechanism.

Note that restrictive holes 78 and 106 are so located in body member 10 as to permit them to be short in length, easily drilled, and readily accessible for inspection. Further, fluid discharged into port 56 travels only the direct and very short path out the trenched arm 60 to reach restriction 78.

During low speed operation of the pumping mechanism, the entire quantity of fluid discharged from the working chambers will pass through the restriction 78. As the speed of the pumping mechanism increases, and the quantity of fluid diverted by valve 94 increases, a larger proportion of the fluid actually utilized by the remote motor is supplied by those working chambers discharging directly into the discharge port 56.

During high speed operation, substantially all the fluid utilized in the system for useful work will be that which is discharged directly into discharge port 56, and passes along the trenched arm 60 and through restriction 78. The fluid discharged into the ports 58, 64, and 66 will pass into pressure chamber 28 and be diverted therefrom by the flow control valve 94. Shortened paths are thus provided for the working fluid at high speed which improves the efficiency of the pumping mechanism.

Further, the manifolding arrangement herein described provides paired, axially opposed discharge ports overlying each discharge zone, all of said ports having independent communication with pressure chamber 28 and common communication with the metering restriction which controls the flow regulating valve. Efficiency of discharge from the working chambers is thus improved and back pressure on the outer ends of the vanes is reduced, thus avoiding high speed separation between the vanes and stator.

While the form of embodiment of the invention as herein disclosed constitutes a preferred form, it is to be understood that other forms might be adopted, all coming within the scope of the claims which follow.

What is claimed is as follows:

1. A vane type fluid pump comprising: telescopically disposed rotor and stator elements having inlet and outlet zones included therebetween; a pair of body members each having a flat plane surface abutting opposite sides of said rotor and stator; an outlet connection port in one of said body members; inlet port means to overlie said inlet zones; a pair of axially opposed outlet ports to overlie each outlet zone, one of said pair being in each of said flat plane surfaces; means including a passage through said stator for manifolding the fluid discharged into said pair of outlet ports prior to delivery to said connection port; passage means in said one body member for conducting the manifolded fluid to the outlet connection port and forming a restriction to flow of the manifolded fluid; and compensating valve means in the other body member controlled by the pressure drop across said restriction to by-pass fluid from said outlet zones to said inlet zones and thus maintain said pressure drop substantially constant.

2. A vane type fluid pump comprising: telescopically disposed rotor and stator elements having inlet and outlet zones included therebetween; a pair of body members each having a flat plane surface abutting opposite sides of said rotor and stator; an outlet connection port in one of said body members; inlet port means to overlie said inlet zones; a pair of axially opposed outlet ports to overlie each outlet zone, one of said pair being in each of said flat plane surfaces; passage means entirely in said one body member interconnecting one of said pair of outlet ports and said connection port; means including a passage through said stator, and including said first named passage means, interconnecting the other of said pair of outlet ports and said connection port; means in said first named passage means forming a restriction to flow therein; and compensating valve means in the other body member controlled by the pressure drop across said restriction to by-pass fluid from said outlet zones to said inlet zones and thus maintain said pressure drop substantially constant.

3. A vane type fluid pump comprising: telescopically disposed rotor and stator elements having a plurality of inlet and a plurality of outlet zones included therebetween; a pair of body members each having a flat plane surface abutting opposite sides of said rotor and stator; an outlet connection port in one of said body members; inlet port means to overlie said inlet zones; a pair of axially opposed outlet ports to overlie each outlet zone, one of said pair being in each of said flat plane surfaces; a delivery passage entirely in said one body member interconnecting one of the outlet ports in that member and said connection port; a manifold chamber in the other body member; passage means entirely in said other body member to connect the outlet ports in that member to said manifold chamber; a separate passage through the stator, associated with each outlet port in said one body member, to connect each of those ports to said manifold chamber; means forming a restriction to flow in said delivery passage; and compensating valve means in said other body member, controlled by the pressure drop across said restriction, to by-pass fluid from said manifold chamber to said inlet zones and thus maintain said pressure drop substantially constant.

4. A vane type fluid pump comprising: telescopically disposed rotor and stator elements having a plurality of inlet and a plurality of outlet zones included therebetween; a first body member having a flat plane surface abutting one side of said stator and rotor; a second body member having a pair of relatively movable elements, one element having a flat plane surface abutting the other side of said stator and rotor; means forming a pressure chamber between said pair of elements, pressure in which urges said one element toward said rotor and stator; an outlet connection port in the first of said body members; inlet port means to overlie said inlet zones; a pair of axially opposed outlet ports to overlie each outlet zone, one of said pair being in each of said flat plane surfaces; a delivery passage entirely in said one body member interconnecting one of the outlet ports in that member and said connection port; means forming a restriction to flow in said delivery passage; passage means entirely in said one element to connect the outlet ports in that element to said pressure chamber; passage means extending through the stator to connect the outlet ports in said one member to said manifold chamber; and compensating value means in said other body member, controlled by the pressure drop across said restriction, to by-pass fluid from said pressure chamber to said inlet zones and thus maintain said pressure drop substantially constant.

References Cited in the file of this patent

UNITED STATES PATENTS

| | | |
|---|---|---|
| 2,544,987 | Gardiner et al. | Mar. 13, 1951 |
| 2,544,988 | Gardiner et al. | Mar. 13, 1951 |
| 2,544,990 | Harrington et al. | Mar. 13, 1951 |
| 2,642,802 | Gardiner | June 23, 1953 |
| 2,649,737 | Hoen et al. | Aug. 25, 1953 |
| 2,677,330 | Rosaen | May 4, 1954 |